(12) United States Patent
Iwasaki (10) Patent No.: US 10,046,489 B2
(45) Date of Patent: Aug. 14, 2018

(54) PLASTIC NUT FOR BALL SCREW AND METHOD FOR MANUFACTURING SAME

(71) Applicant: KURODA PRECISION INDUSTRIES LTD., Kawasaki-shi, Kanagawa (JP)

(72) Inventor: Yoshimi Iwasaki, Kisarazu (JP)

(73) Assignee: Kuroda Precision Industries Ltd., Kawasaki-shi, Kanagawa (JP)

( * ) Notice: Subject to any disclaimer, the term of this patent is extended or adjusted under 35 U.S.C. 154(b) by 409 days.

(21) Appl. No.: 14/392,058

(22) PCT Filed: Nov. 18, 2013

(86) PCT No.: PCT/JP2013/006759
§ 371 (c)(1),
(2) Date: Jul. 14, 2015

(87) PCT Pub. No.: WO2014/125534
PCT Pub. Date: Aug. 21, 2014

(65) Prior Publication Data
US 2015/0314498 A1 Nov. 5, 2015

(30) Foreign Application Priority Data

Feb. 12, 2013 (JP) ................. 2013-024877

(51) Int. Cl.
| | |
|---|---|
| *F16H 1/24* | (2006.01) |
| *F16H 55/02* | (2006.01) |
| *B29C 45/00* | (2006.01) |
| *B29C 45/17* | (2006.01) |
| *F16B 37/00* | (2006.01) |
| *F16H 25/24* | (2006.01) |
| *B24B 19/02* | (2006.01) |
| *B29K 81/00* | (2006.01) |
| *F16H 25/22* | (2006.01) |

(Continued)

(52) U.S. Cl.
CPC ........ *B29C 45/0055* (2013.01); *B24B 19/022* (2013.01); *B29C 45/0005* (2013.01); *B29C 45/178* (2013.01); *F16B 37/00* (2013.01); *F16H 25/24* (2013.01); *B29C 2045/0012* (2013.01); *B29C 2045/0058* (2013.01); *B29K 2081/04* (2013.01); *B29K 2105/12* (2013.01); *B29K 2905/12* (2013.01); *B29K 2995/0012* (2013.01); *B29L 2001/005* (2013.01); *F16H 25/2214* (2013.01); *F16H 2025/249* (2013.01)

(58) Field of Classification Search
CPC .......... F16H 2025/249; F16H 25/2214; B24B 19/022; B29C 2045/0058; B29L 2001/005
See application file for complete search history.

(56) References Cited

U.S. PATENT DOCUMENTS 3,713,932 A * 1/1973 Butzow ................. B29C 53/585
156/161

FOREIGN PATENT DOCUMENTS

| JP | 59-148635 A | 8/1984 |
| JP | 59-199210 A | 11/1984 |
| JP | 7-290902 A | 11/1995 |

(Continued)

*Primary Examiner* — Jake Cook
(74) *Attorney, Agent, or Firm* — Marshall & Melhorn, LLC (57) ABSTRACT

In a plastic nut for a ball screw formed by injection molding fiber reinforced plastic, the reduction in precision over time due to wear is minimized. A thread groove is ground until the fibers in matrix plastic are exposed on the surface of the thread groove.

3 Claims, 6 Drawing Sheets (51) Int. Cl.
  *B29L 1/00*   (2006.01)
  *B29K 105/12*   (2006.01)

(56) References Cited

FOREIGN PATENT DOCUMENTS

| | | |
|---|---|---|
| JP | 10-281132 A | 10/1998 |
| JP | 2001-116102 A | 4/2001 |
| JP | 2010-138928 A | 6/2010 |

* cited by examiner

I : skin layer
II : alignment layer
III : core layer

PLASTIC NUT FOR BALL SCREW AND METHOD FOR MANUFACTURING SAME

TECHNICAL FIELD

The present invention relates to a plastic nut for a ball screw and a method for manufacturing the same, and in particular to a plastic nut for a ball screw made by injection molding fiber reinforced plastic formed by mixing a reinforcing material consisting of fibers in matrix plastic and a method for manufacturing the same.

BACKGROUND OF THE INVENTION

As a nut for use in a feed screw mechanism, it is known to use a plastic nut made by injection molding fiber reinforced plastic formed by mixing whiskers in matrix plastic consisting of PPS (polyphenylene sulfide resin). See Patent Document 1, for instance. Such a nut for use in a feed screw mechanism can be made either by machining the screw thread therein or injection molding the screw thread therein.

PRIOR ART DOCUMENTS(S)

Patent Document(s)

Patent Document 1: JP2001-116102A

SUMMARY OF THE INVENTION

Task To Be Accomplished by the Invention

A feed screw nut made of fiber reinforced plastic has a greater load bearing capability than a feed screw nut made of common plastic. However, when machining a screw thread, the presence of reinforcing fibers in the material causes a normal cutting tool to wear out relatively quickly. Therefore, an expensive cutting tool such as a diamond coated tool is required, and this causes an increase in the manufacturing cost. Also, because fiber reinforced plastic has a higher thermal expansion coefficient than steel, the machining speed has to be controlled in order to avoid deformation due to the heat produced by the cutting process, and this further contributes to the increase in the manufacturing cost.

A feed screw nut made of fiber reinforced plastic having a screw thread formed during an injection molding process can be produced in a more efficient manner than a feed screw nut having a screw thread formed by machining, and can therefore be made at a lower production cost. However, a thread formed by an injection molding process tends to wear out relatively quickly during the use in a feed screw mechanism, and a positional inaccuracy may be caused at a relatively early stage in use owing to the reduction in the dimensional precision of the thread. Therefore, a feed screw nut made having a thread formed during an injection molding process may not be able to achieve a high dimensional precision that may be required.

The inventor of the present invention has conducted an extensive experimental research into the cause of an early wear of the nut made of fiber reinforced plastic having a screw thread formed by injection molding, and has discovered a certain fact.

When fiber reinforced plastic is injection molded, a skin layer having a thickness of a few micro meters devoid of fibers is formed on the outermost (surface) layer of the thread groove. The skin layer is strictly made of the matrix plastic, and has a lower wear resistance than a material containing fibers. Therefore, it was concluded that the presence of a skin layer on the outermost layer of the thread groove is a major cause of the early wear of the nut made of fiber reinforced plastic.

When fiber reinforced plastic is injection molded, an alignment layer containing a large number of fibers aligned along the plane of the skin layer is produced inward of the skin layer. When the skin layer has worn out, the alignment layer appears on the surface of the thread groove. Because a large part of the fibers of the alignment layer exposed to the surface of the thread groove lay along the surface of the thread groove, the fibers are not entirely buried in the matrix plastic, and are therefore relatively weakly bonded to the matrix plastic for the fibers. It was observed that the alignment layer is more wear resistant than the skin layer, but the presence of the alignment layer causes the peeling of the fibers over time, and the resulting wear in the matrix plastic causes a reduction in the dimensional precision of the thread groove over time. Based on this finding, it was concluded that the presence of an alignment layer is not desirable from the beginning of use when a particularly high dimensional precision is required. Also, it was observed in ball screw applications that the fragments of the fibers that detached from the matrix plastic may obstruct the rolling of the balls in the thread groove so that the performance of the ball screw may be impaired.

Thus, in view of the results of the studies conducted by the inventor, a primary object of the present invention is to provide a nut for a ball screw made of fiber reinforced plastic and having a screw thread formed by injection molding which can reduce an early wear of the nut, and maintain a high dimensional precision over an extended period of time.

Means to Accomplish the Task

The present invention provides a plastic nut for a ball screw defining a threaded bore (24) including a screw thread groove (22) and formed by injection molding fiber reinforced plastic containing matrix plastic (M) and reinforcing fibers (F) mixed therein, wherein: the screw thread groove (22) is ground until the fibers (F) are exposed on a surface of the screw thread groove (22).

According to this arrangement, because the fibers (F) are exposed on the surface of the thread groove (22) from the beginning, an early wear can be avoided, and a high dimensional precision can be maintained over an extended period of time.

Preferably, the plastic nut for a ball screw of the present invention may further comprise an alignment layer (II) containing fibers (F) extending along a surface of the thread groove (22), the thread groove (22) being ground until the alignment layer (II) is exposed.

According to this arrangement, because the thread groove is ground until the alignment layer (II) containing fibers (F) is reached, an early wear can be avoided, and a high dimensional precision can be maintained over an extended period of time.

Preferably, the plastic nut for a ball screw of the present invention may further comprise a core layer (III) containing fibers (F) that are not aligned, the thread groove (22) being ground until the core layer (III) is exposed.

According to this arrangement, because the thread groove is ground until the core layer (III) containing fibers (F) that are not aligned is reached, an early wear can be avoided even further, and a high dimensional precision can be maintained over an extended period of time.

The present invention further provides a method for manufacturing a plastic nut for a ball screw containing matrix plastic (M) and reinforcing fibers (F) mixed therein, comprising: a first step of injection molding a nut (20) defining a threaded bore (24) including a pre-finish screw thread groove configured and dimensioned to pre-finish specifications by using a molding metallic die assembly; and a second step of finishing the screw thread groove (22) to final specifications by grinding the pre-finish screw thread groove until the fibers (F) are exposed to a surface of the screw thread groove.

According to this arrangement, because the pre-finish screw thread groove is ground until the fibers (F) are exposed on the surface of the screw thread groove (22), an early wear can be avoided, and a high dimensional precision can be maintained over an extended period of time.

Preferably, in this method for manufacturing a plastic nut for a ball screw, immediately following the first step, the nut is configured to have a skin layer (I) defining an outermost layer and devoid of fibers (F), an alignment layer (II) located more inward than the skin layer (I) and containing fibers (F) aligned along a surface of the skin layer and a core layer (III) located more inward than the alignment layer (II) and containing fibers (F) that are not aligned; and wherein the second step comprises a grinding step for removing at least the skin layer (I).

According to this arrangement, because the skin layer (I) is removed in the second step, the fibers (F) are exposed on the surface of the thread groove (22) from the beginning of use so that an early wear can be avoided, and a high dimensional precision can be maintained over an extended period of time.

Preferably, in this method for manufacturing a plastic nut for a ball screw, the second step comprises a grinding step for removing the alignment layer (II).

According to this arrangement, because the alignment layer (II) containing a large amount of aligned fibers is substantially absent from the beginning of use, the reduction in the wear resistance due to the peeling of the fibers (F) in the alignment layer (II) can be avoided.

Preferably, in this method for manufacturing a plastic nut for a ball screw, the second step comprises a grinding step that removes an amount (G) of material adequate to expose the core layer (III) on the surface of the thread groove.

According to this arrangement, because the core layer (III) is exposed on the surface of the thread groove (22) from the beginning of use, an early wear can be avoided even further, and a high dimensional precision can be maintained over an extended period of time.

Effect of the Invention

According to the plastic nut for a ball screw and the method for manufacturing the same of the present invention, because the screw thread groove is ground until the fibers in the matrix plastic are exposed on the surface of the screw thread groove, an early wear can be avoided, and a high dimensional precision can be maintained over an extended period of time.

DESCRIPTION OF THE PREFERRED EMBODIMENT(S)

An embodiment of the ball screw in which the plastic nut is used is described in the following with reference to FIGS. 1 to 4.

Figure 1:
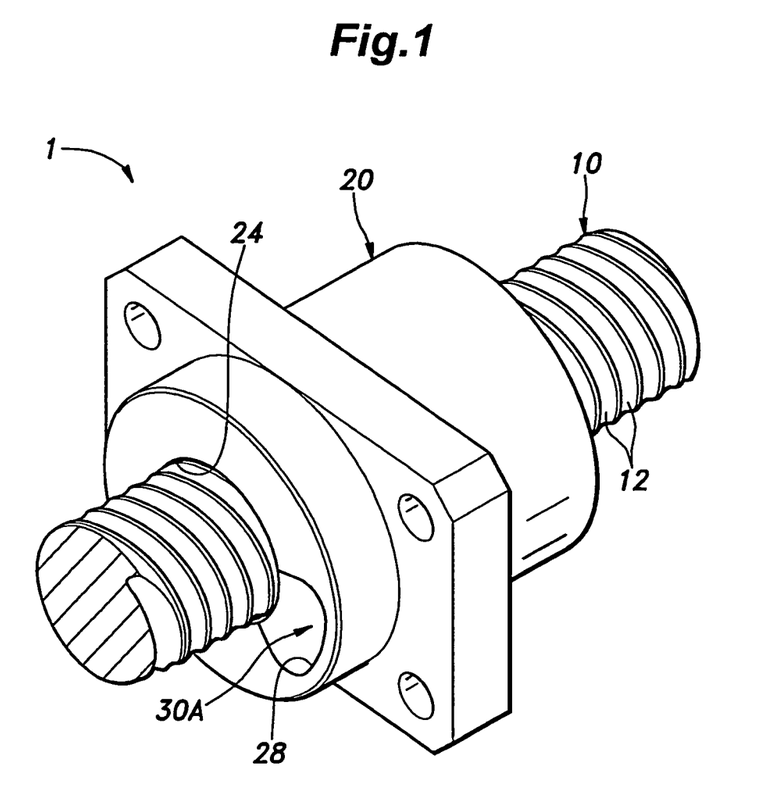
FIG. 1 is a perspective view showing a nut for a ball screw embodying the present invention.
Figure 2:
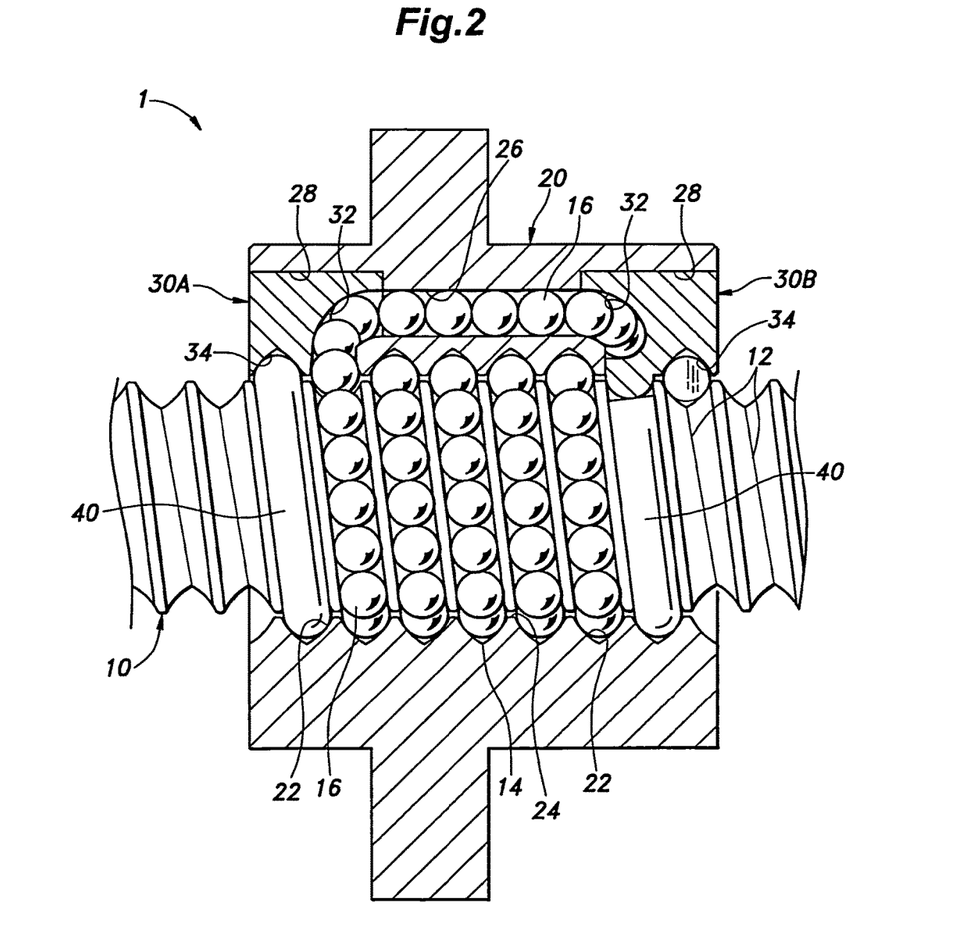
FIG. 2 is a sectional view of the ball screw.

As shown in FIGS. 1 and 2, a ball screw 1 includes a screw shaft 10 having a male screw thread groove 12 formed on the outer circumferential surface thereof, a nut (plastic nut for a ball screw) 20 defining a threaded bore 24 having a female screw thread groove 22 formed on the inner circumferential surface thereof and a pair of end deflectors 30A and 30B fitted to either axial end of the nut 20. The screw shaft 10 is made of roll formed stainless steel, the nut 20 is made of injection molded fiber reinforced plastic, and the end deflectors 30A and 30B are made of injection molded high polymer plastic such as POM (polyacetal resin) and PPS (polyphenylene sulfide resin).

Each end deflector 30A, 30B is fitted into a recess 28 formed in the corresponding axial end of the nut 20, and is fixedly secured therein by using an end deflector fixing member 40. Each end deflector fixing member 40 consists of a coil of slightly less than one turn made of spring steel wire, and is engaged jointly by the male thread groove 12, the female thread groove 22 and an engagement groove 34 formed in the corresponding end deflector 30A, 30B in smooth continuation with the female thread groove 22 such that the end deflector 30 is fixedly retained to the nut 20.

The screw shaft 10 is passed axially through the threaded bore 24, and a ball roll track 14 is defined between the screw shaft 10 and the threaded bore 24. The male thread groove 12 and the female thread groove 22 are each provided with a gothic arch configuration which combines a pair of identical arcs in a symmetric pattern in the illustrated embodiment. A plurality of balls (steel balls) 16 typically made of stainless steel are filled into the ball roll track 14 and a pair of ball return passages 26 and 32 which are formed in the nut 20 and the end deflectors 30, respectively, for free rolling movement.

The ball return passage 26 formed in the nut 20 extends axially in parallel with the threaded bore 24 on a radial side of the threaded bore 24, and communicates at each axial end with the ball return passage 32 formed in the corresponding end deflector 30 in a hook shape. As shown in FIG. 2, as the balls 16 move from the left to the right in the ball return passage 32, for instance, one of the end deflectors 30A scoops up the balls 16 from the ball roll track 14 to the corresponding ball return passage 32 while the other end deflector 30B returns the balls 16 back to the ball roll track 14 from the corresponding ball return passage 32. As a result, with the screw shaft 10 threaded into the nut 20 via the balls 16, the rotation of the screw shaft 10 is converted into the axial linear movement of the nut 20 as the balls 16 circulate in the nut 20.

The material and the manufacturing method of the nut 20, and the surface condition of the female thread groove 22 are discussed in the following.

The matrix plastic for the fiber reinforced plastic, which the nut 20 is made of, may consist of super engineering plastic such as PPS (polyphenylene sulfide resin). The fibers that can be used for the reinforcing fibers may consist of short fibers having a diameter of 0.1 μm to 5.0 μm and a length of 1 μm to 100 μm. The fibers may consist of glass fibers, carbon (graphite) fibers, polyamide fibers, boron fibers, aramid fibers, silicon carbide whiskers, silicon nitride whiskers, zinc oxide whiskers, titanium boride whiskers, metallic fibers, silica fibers and titanium oxide fibers.

The manufacturing process of the nut 20 may comprise a first step of injection molding the entire nut 20 in a molding die assembly by using fiber reinforced plastic containing matrix plastic and fibers mixed therein as the plastic material for the injection molding process such that the nut 20 may be provided with a pre-finish thread groove configured and dimensioned to prescribed pre-finish specifications which may be later finished into the final thread groove 22. The manufacturing process may further comprise a second step of finishing the pre-finish thread groove to the specifications of the final female thread groove 22 by using a screw grinding machine until the fibers of the fiber reinforced plastic are exposed on the surface of the thread groove, following the injection molding (curing) process.

The pre-finish thread groove formed by the injection molding process is provided with a same phase and a same thread pitch as the final female thread groove 22, and a same configuration as the final female thread groove 22 or the gothic arch configuration, but is shallower than the final female thread groove 22 by a removal amount G (See FIG. 3a) which is to be ground off in the second step. In other words, the pre-finish thread groove has a smaller groove cross section than the final thread groove 22 by the removal amount G of the material that is to be ground off.

Because the final female thread groove 22 and the pre-finish thread groove have a same configuration, the removal amount G to be ground off is uniform over the entire thread groove so that the entire surface of the thread groove is ground in the first grinding pass, and the amount of material that is ground off (that is removed) is significantly great from the first grinding pass. Therefore, the grinding work can be performed in an efficient manner. The pre-finish thread groove may be molded at a high precision that should be adequate to allow the thread groove to be used as it is as a normal thread groove having an acceptably high precision in terms of configuration and dimensions. Thereby, the grinding work in the finishing process may be performed with a minimum amount of material removal in a short period of time.

Figure 3A:
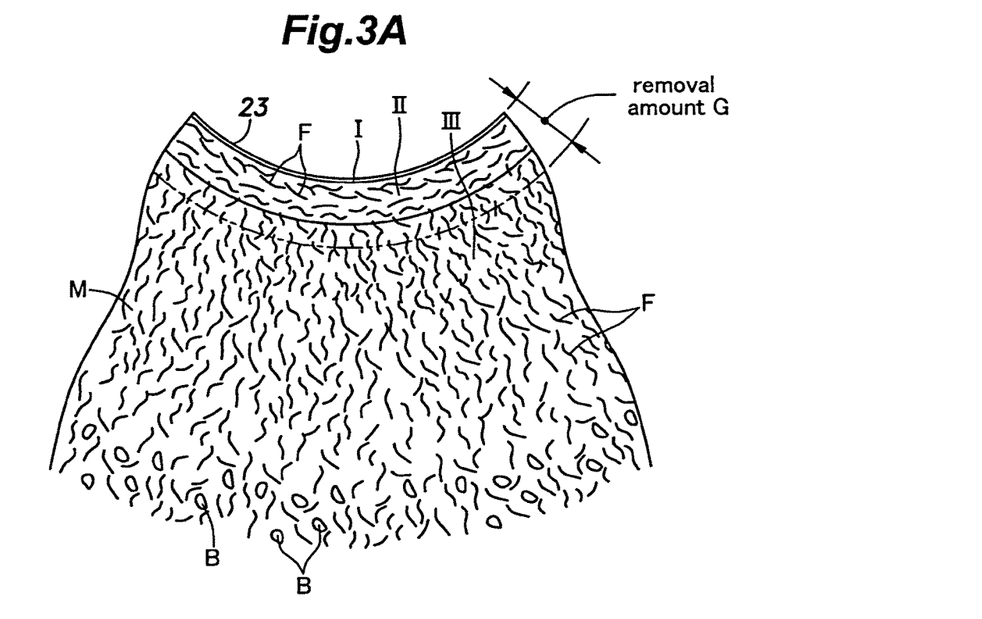
FIG. 3a is a diagram showing the internal structure of the thread groove region of the plastic nut for a ball screw before the grinding process in the illustrated embodiment.
Figure 3B:
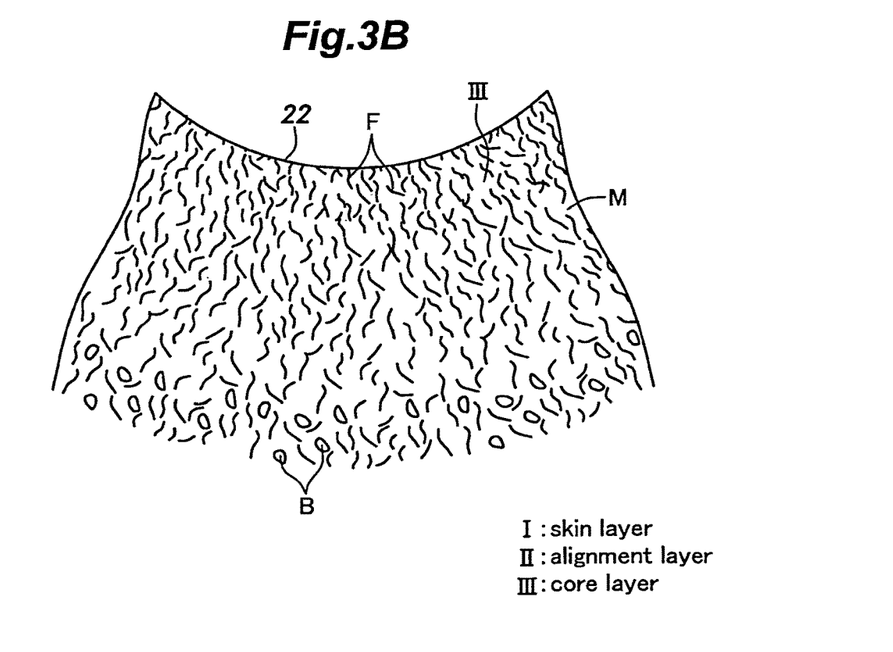
FIG. 3b is a diagram showing the internal structure of the thread groove region of the plastic nut for a ball screw after the grinding process in the illustrated embodiment.

FIG. 3a schematically shows the inner structure of the thread groove region of the nut 20 (nut material) immediately before the first step of grinding work, and FIG. 3b schematically shows the inner structure of the thread groove region of the nut 20 following the completion of the grinding work. In FIGS. 3a and 3b, letter M denotes matrix plastic, letter F denotes fibers, and letter B denotes voids. In FIG. 3a, numeral 23 denotes the pre-finish thread groove.

Following the injection molding process and before the grinding work, as shown in FIG. 3a, the fibers F are absent in the outermost layer of the nut 20. More specifically, the nut 20 includes a skin layer I consisting solely of matrix plastic M, an alignment layer II located more inward than the skin layer I and containing fibers largely aligned along the surface of the skin layer I and a core layer III located more inward than the alignment layer II and containing fibers largely not aligned. In reality, there may not be clear boundaries between the various layers, and the skin layer I may gradually change to the alignment layer II, and the alignment layer II may gradually change to the core layer III.

In the second step, the pre-finish female thread groove 23 (which is to be finished as the female thread groove 22) is ground so as to remove at least the skin layer I thereof until the fibers F in the matrix plastic M are exposed on the surface of the female thread groove 22. Preferably, the alignment layer II is removed by a certain removal amount G until the core layer III is exposed on the surface of the female thread groove 22 by this grinding process. This grinding process causes the female thread groove 22 to acquire the prescribed final depth. As the skin layer II is about 1 μm to 2 μm in thickness, and the alignment layer II is about 50 μm to 100 μm in thickness, the removal amount G may be 0.2 mm or less.

Preferably, the removal amount G is selected as a minimum amount that is required to expose the core layer III on the surface of the female thread groove 22 so that the voids B may not be exposed on the surface of the female thread groove 22, and the time required for the grinding work may be minimized.

Thus, the skin layer I and the alignment layer II are removed, and the core layer II is ground off but only to such an extent that the voids B that may be present in the core layer III are not exposed on the surface of the female thread groove 22. This is significant for the female thread groove 22 to acquire a high level of wear resistance.

By performing the grinding work until the core layer III is reached beyond the alignment layer II, those fibers that are located in the part of the material of the nut 20 that is to be removed (corresponding to the removal amount G) and aligned in the depth-wise direction (or the fibers F located adjacent to the alignment layer II) are removed of lengthwise end portions thereof so that the end surfaces of such fibers are exposed flush on the surface of the female thread groove 22.

Figure 4A:
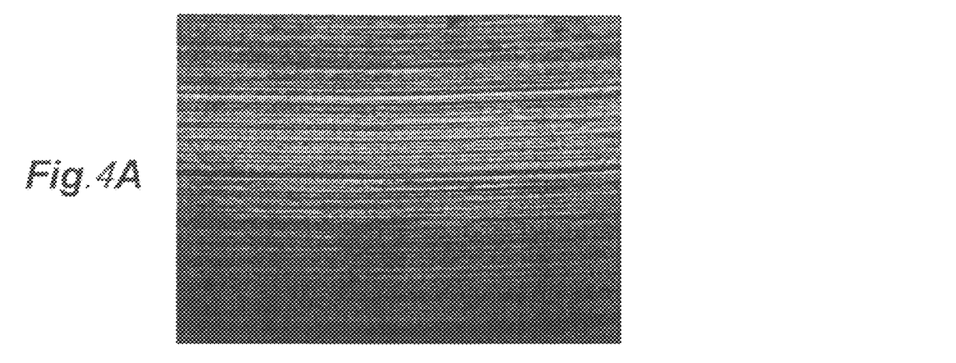
FIG. 4a is a microscopic photograph of the surface of the thread groove region of the plastic nut for a ball screw before the grinding step in the illustrated embodiment.
Figure 4B:
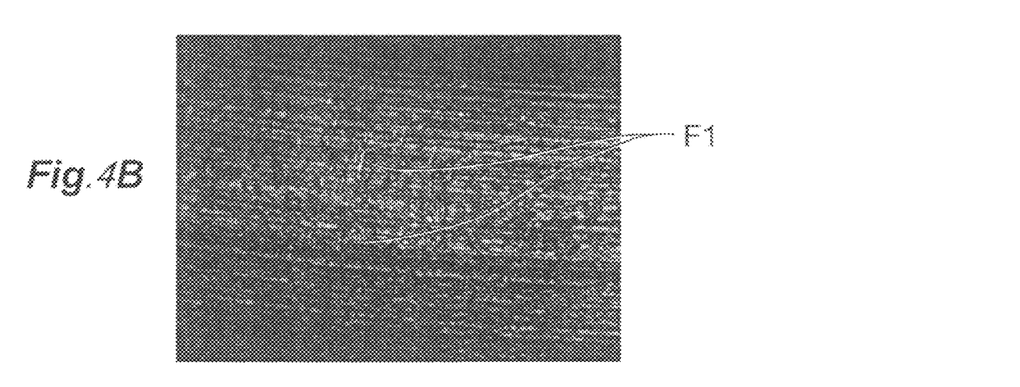
FIG. 4b is a microscopic photograph of the surface of the thread groove region of the plastic nut for a ball screw after the skin layer is removed in the illustrated embodiment.
Figure 4C:
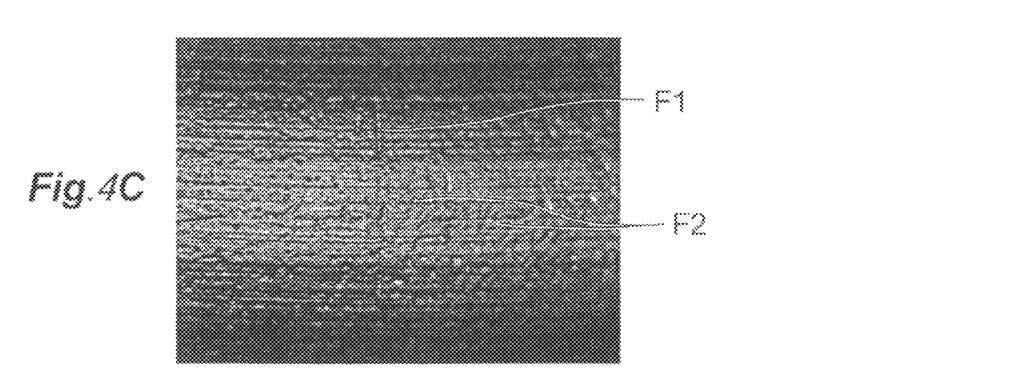
FIG. 4c is a microscopic photograph of the surface of the thread groove region of the plastic nut for a ball screw after the alignment layer is removed in the illustrated embodiment.

FIGS. 4a to 4c are microscopic photographs showing the thread screw region of the nut 20. FIG. 4a shows the surface of the thread groove before the grinding work, FIG. 4b shows the surface of the thread groove after the skin layer has been removed, and FIG. 4c shows the surface of the thread groove after the alignment layer has been removed.

In FIG. 4a, no fibers can be observed on the surface of the thread groove. In FIG. 4b, the alignment layer II is exposed on the surface of the thread groove, and the numerous white streaks visible on the thread screw surface indicate the presence of fibers F1 extending along the surface of the thread groove. In FIG. 4c, the core layer III is exposed on the surface of the thread groove, and the presence of fibers F1 extending along the surface of the thread groove is barely visible, but the ground end surfaces of the fibers F2 exposed on the surface of the thread groove are visible in a large number.

When the skin layer I consisting solely of the matrix plastic is absent on the surface of the female thread groove from the beginning of use owing to the execution of the second step, an early wear of the female thread groove can be avoided. When the alignment layer II containing a large amount of aligned fibers F1 is substantially absent on the surface of the thread groove from the beginning of use, the reduction in the wear resistance due to the peeling of the fibers F in the alignment layer II can be avoided, and the wear resistance of the thread groove 22 can be improved. Furthermore, when the length-wise end portions of the fibers F that are present in the core layer III are removed by grinding, and the end surfaces of these end portions are exposed flush on the surface of the female thread groove in a large number, such fibers act as firm piles driven into the matrix plastic M so that the wear resistance of the female thread groove can be increased even further owing to the high wear resistance of the fibers F. Owing to the reduction in or the absence of the peeling of the fibers, obstruction of the rolling movement of the balls 16 in the ball roll track 14 by dislodged fibers can be avoided.

By thus grinding and removing the skin layer I or both the skin layer I and the alignment layer II, by grinding the surface of the thread groove until the core layer III is reached, or by grinding and removing the lengthwise end portions of the fibers F that are aligned in the depth-wise direction in the core layer III until the end surfaces of these end portions are exposed flush on the surface of the female thread groove, the wear resistance of the female thread groove 22 can be improved in correspondingly high degrees. Any one of these four levels of grinding work can be selected in dependence on the requirement of the wear resistance of the female thread groove 22.

The present invention has been described in terms of a preferred embodiment thereof, but is not limited by this embodiment, and can be modified in various ways without departing from the spirit of the present invention.

For instance, the circulation of the balls can be accomplished not only by using the end deflectors but also by using tubes, other forms of deflectors and end caps. The configuration of the screw thread groove is not limited by the gothic arch configuration, but may also be a circular, elliptic or V configuration.

The components included in the aforementioned embodiment are not entirely essential for the implementation of the present invention, but may be partly substituted and omitted without departing from the spirit of the present invention.

The present invention is not limited to a plastic nut for a ball screw, but may also be applied to other fiber reinforced plastic members having a rolling or a sliding surface, such as ball screw shafts, slide screw shafts, linear guides with rolling balls, sliders having guide grooves for rolling balls, outer and inner races of roller and ball bearings and sleeves for slide bearings.

Figure 5:
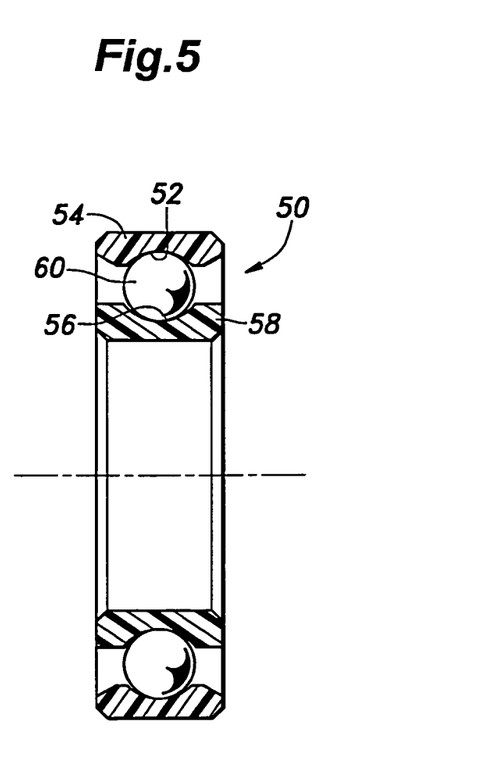
FIG. 5 is a sectional view of a ball bearing given as another embodiment of the present invention.

FIG. 5 shows a ball bearing 50 given as a second embodiment of the present invention. The ball bearing 50 includes an annular outer race 54 having a ball roll groove 52 defined by an arcuate bottom surface on the inner circumference thereof, an annular inner race 58 having a ball roll groove 56 defined by an arcuate bottom surface on the outer circumference thereof and a plurality of steel or ceramic balls 60 that are interposed in a rolling engagement between the ball roll groove 52 of the outer race 54 and the ball roll groove 56 of the inner race 58 disposed in a mutually concentric arrangement.

The outer race 54 and the inner race 58 are made of injection molded fiber reinforced plastic. The matrix plastic for the fiber reinforced plastic forming the outer race 54 and the inner race 58 may consist of super engineering plastic such as PPS (polyphenylene sulfide resin). The fibers that can be used for the reinforcing fibers may consist of short fibers having a diameter of 0.1 µm to 5.0 µm and a length of 1 µm to 100 µm. The fibers may consist of glass fibers, carbon (graphite) fibers, polyamide fibers, boron fibers, aramid fibers, silicon carbide whiskers, silicon nitride whiskers, zinc oxide whiskers, titanium boride whiskers, metallic fibers, silica fibers and titanium oxide fibers.

The manufacturing process of the outer race 54 and the inner race 58 may comprise a first step of injection molding the outer race 54 and the inner race 58 in molding die assemblies by using fiber reinforced plastic containing matrix plastic and fibers mixed therein as the plastic material for the injection molding process such that the outer race 54 and the inner race 58 may be provided with pre-finish ball roll grooves configured and dimensioned to prescribed pre-finish specifications which may be later finished into the final ball roll grooves 52 and 56, respectively. The manufacturing process may further comprise a second step of finishing the pre-finish ball roll grooves to the specifications of the final ball roll grooves 52 and 56 by using a grinding machine until the fibers of the fiber reinforced plastic are exposed on the surfaces of the ball roll grooves, following the injection molding (curing) process.

Following the injection molding process and before the grinding work, in the outer race 54 and the inner race 58, similarly as in the plastic nut 20 discussed above, the fibers F are absent in the outermost layer. More specifically, the outer race 54 and the inner race 58 each include a skin layer consisting solely of matrix plastic, an alignment layer located more inward than the skin layer and containing fibers largely aligned along the surface of the skin layer I and a core layer located more inward than the alignment layer and containing fibers largely not aligned. In the outer race 54 and the inner race 58 also, in reality, there may not be clear boundaries between the various layers, and the skin layer may gradually change to the alignment layer, and the alignment layer may gradually change to the core layer.

In the second step, the pre-finish ball roll grooves 52 and 56 (which are to be finished as the final ball roll grooves 52 and 56) are ground so as to remove at least the skin layer thereof until the fibers in the matrix plastic are exposed on the surface of the ball roll grooves 52 and 56, respectively. Preferably, the alignment layer is removed by a certain removal amount until the core layer is exposed on the surface of each ball roll groove 52, 56 by this grinding process. This grinding process causes the ball roll grooves 52 and 56 to acquire the prescribed final depth. Preferably, the removal amount is selected as a minimum amount that is required to expose the core layer on the surface of the ball roll grooves 52 and 56 so that the voids may not be exposed on the surface of the ball roll grooves 52 and 56, and the time required for the grinding work may be minimized.

Thus, the skin layer and the alignment layer are removed, and the core layer is ground off but only to such an extent that the voids that may be present in the core layer are not exposed on the surface of the ball roll grooves 52 and 56. This is significant for the ball roll grooves 52 and 56 to acquire a high level of wear resistance.

By performing the grinding work until the core layer is reached beyond the alignment layer, those fibers that are located in the part of the material to be removed and aligned in the depth-wise direction (or the fibers located adjacent to the alignment layer) are removed of lengthwise end portions thereof so that the end surfaces of such fibers are exposed flush on the surface of the ball roll grooves 52 and 56.

When the skin layer consisting solely of the matrix plastic is absent on the surfaces of the ball roll grooves 52 and 56 from the beginning of use owing to the execution of the second step, an early wear of the ball roll grooves 52 and 56 can be avoided. When the alignment layer containing a large amount of aligned fibers is substantially absent on the surface of the ball roll grooves 52 and 56 from the beginning of use, the reduction in the wear resistance due to the peeling of the fibers in the alignment layer can be avoided, and the wear resistance of the ball roll grooves 52 and 56 can be improved. Furthermore, when the length-wise end portions of the fibers that are present in the core layer are removed by grinding, and the end surfaces of these end portions are exposed flush on the surface of the ball roll grooves 52 and 56 in a large number, such fibers act as firm piles driven into the matrix plastic so that the wear resistance of the ball roll grooves 52 and 56 can be increased even further owing to the high wear resistance of the fibers.

By thus grinding and removing the skin layer or both the skin layer and the alignment layer, by grinding the surface of the ball roll grooves 52 and 56 until the core layer is reached, or by grinding and removing the lengthwise end portions of the fibers that are aligned in the depth-wise direction in the core layer until the end surfaces of these end portions are exposed flush on the surface of the ball roll grooves 52 and 56, the wear resistance of the ball roll grooves 52 and 56 can be improved in correspondingly high degrees. Any one of these four levels of grinding work can be selected in dependence on the requirement of the wear resistance of the ball roll grooves 52 and 56.

Figure 6:
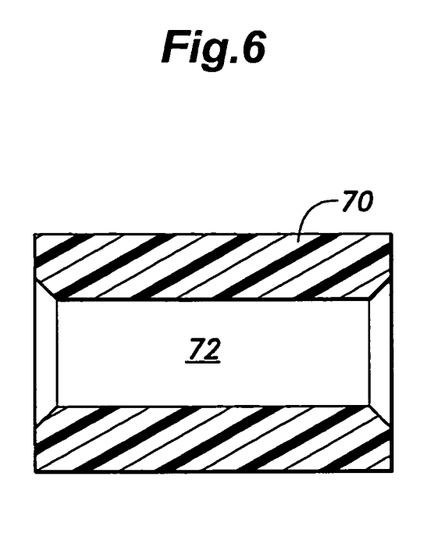
FIG. 6 is a sectional view of a slide bearing sleeve given as yet another embodiment of the present invention.

FIG. 6 is a sectional view of a slide bearing sleeve 70 given as yet another embodiment of the present invention. The matrix plastic for the fiber reinforced plastic, which the slide bearing sleeve 70 is made of, may consist of super engineering plastic such as PPS (polyphenylene sulfide resin). The fibers that can be used for the reinforcing fibers may consist of short fibers having a diameter of 0.1 μm to 5.0 μm and a length of 1 μm to 100 μm. The fibers may consist of glass fibers, carbon (graphite) fibers, polyamide fibers, boron fibers, aramid fibers, silicon carbide whiskers, silicon nitride whiskers, zinc oxide whiskers, titanium boride whiskers, metallic fibers, silica fibers and titanium oxide fibers.

The manufacturing process of the slide bearing sleeve 70 may comprise a first step of injection molding the entire slide bearing sleeve 70 in a molding die assembly by using fiber reinforced plastic containing matrix plastic and fibers mixed therein as the plastic material for the injection molding process such that the slide bearing sleeve 70 may be provided with a pre-finish bearing bore configured and dimensioned to prescribed pre-finish specifications which may be later finished into the final bearing bore 72. The manufacturing process may further comprise a second step of finishing the pre-finish bearing bore to the specifications of the final bearing bore 72 by using a grinding machine until the fibers of the fiber reinforced plastic are exposed on the surface of the bearing bore 72, following the injection molding (curing) process.

Following the injection molding process and before the grinding work, in the slide bearing sleeve 70, similarly as in the plastic nut 20 discussed above, the fibers are absent in the outermost layer. More specifically, the slide bearing sleeve 70 includes a skin layer consisting solely of matrix plastic, an alignment layer located more inward than the skin layer and containing fibers largely aligned along the surface of the skin layer and a core layer located more inward than the alignment layer and containing fibers largely not aligned. In the slide bearing sleeve 70 also, in reality, there may not be clear boundaries between the various layers, and the skin layer may gradually change to the alignment layer, and the alignment layer may gradually change to the core layer.

In the second step, the pre-finish bearing bore (which is to be finished as the final bearing bore 72) is ground so as to remove at least the skin layer thereof until the fibers in the matrix plastic are exposed on the surface (inner circumferential surface) of the bearing bore 72. Preferably, the alignment layer is removed by a certain removal amount until the core layer is exposed on the surface of the bearing bore 72 by this grinding process. This grinding process causes the bearing bore 72 to acquire the prescribed final inner diameter. Preferably, the removal amount is selected as a minimum amount that is required to expose the core layer on the surface of the bearing bore 72 so that the voids may not be exposed on the surface of the bearing bore 72, and the time required for the grinding work may be minimized.

Thus, the skin layer and the alignment layer are removed, and the core layer is ground off but only to such an extent that the voids that may be present in the core layer are not exposed on the surface of the bearing bore 72. This is significant for the bearing bore 72 to acquire a high level of wear resistance.

By performing the grinding work until the core layer is reached beyond the alignment layer, those fibers that are located in the part of the material to be removed and aligned in the depth-wise direction (or the fibers located adjacent to the alignment layer) are removed of lengthwise end portions thereof so that the end surfaces of such fibers are exposed flush on the surface of the bearing bore 72.

When the skin layer consisting solely of the matrix plastic is absent on the surfaces of the bearing bore 72 from the beginning of use owing to the execution of the second step, an early wear of the bearing bore 72 can be avoided. When the alignment layer containing a large amount of aligned fibers is substantially absent on the surface of the bearing bore 72 from the beginning of use, the reduction in the wear resistance due to the peeling of the fibers in the alignment layer can be avoided, and the wear resistance of the bearing bore 72 can be improved. Furthermore, when the lengthwise end portions of the fibers that are present in the core layer are removed by grinding, and the end surfaces of these end portions are exposed flush on the surface of the bearing bore 72 in a large number, such fibers act as firm piles driven into the matrix plastic so that the wear resistance of the bearing bore 72 can be increased even further owing to the high wear resistance of the fibers.

By thus grinding and removing the skin layer or both the skin layer and the alignment layer, by grinding the surface of the bearing bore 72 until the core layer is reached, or by grinding and removing the lengthwise end portions of the fibers that are aligned in the depth-wise direction in the core layer until the end surfaces of these end portions are exposed flush on the surface of the bearing bore 72, the wear resistance of the bearing bore 72 can be improved in correspondingly high degrees. Any one of these four levels of grinding work can be selected in dependence on the requirement of the wear resistance of the bearing bore 72.

Although the present invention has been described in terms of preferred embodiments thereof, it is obvious to a person skilled in the art that various alterations and modifications are possible without departing from the scope of the present invention.

The components included in the aforementioned embodiment are not entirely essential for the implementation of the present invention, but may be partly substituted and omitted without departing from the spirit of the present invention.

The contents of the original Japanese patent application (JP2013-24877 filed Feb. 12, 2013) on which the Paris Convention priority claim is made for the present application are incorporated in this application by reference.

LIST OF NUMERALS

1 ball screw
10 screw shaft
12 male screw thread groove
14 ball roll track
16 ball
20 nut (plastic nut for a ball screw)
22 female screw thread groove
24 threaded bore
26 ball return passage
30 end deflector
32 ball return passage
50 ball bearing
52 ball roll groove
54 outer race
56 ball roll groove
58 inner race
70 slide bearing sleeve
72 bearing bore
I skin layer
II alignment layer
III core layer
B void
F fiber
G removal amount
M matrix plastic

The invention claimed is:

1. A plastic nut for a ball screw defining a threaded bore including a screw thread groove and formed by injection molding fiber reinforced plastic containing matrix plastic and reinforcing fibers mixed therein, wherein:
    the screw thread groove is ground until the fibers are exposed on a surface of the screw thread groove; and
    the plastic nut further comprises an alignment layer containing fibers extending along a surface of the thread groove, the thread groove being ground until the alignment layer is exposed; and
    the fibers include unwoven fibers distributed in the matrix plastic.

2. A plastic nut for a ball screw defining a threaded bore including a screw thread groove and formed by injection molding fiber reinforced plastic containing matrix plastic and reinforcing fibers mixed therein, wherein:
    the screw thread groove is ground until the fibers are exposed on a surface of the screw thread groove; and
    the plastic nut further comprises a core layer containing fibers that are not aligned, the thread groove being ground until the core layer is exposed.

3. The plastic nut according to claim 1, wherein the fibers have a diameter of 0.1 μm to 5.0 μm and a length of 1 μm to 100 μm.

* * * * *